April 27, 1948. R. A. NORBOM 2,440,379
TRANSPORT VEHICLE
Filed Jan. 12, 1945 2 Sheets-Sheet 1

Inventor
RAGNAR A. NORBOM

April 27, 1948.  R. A. NORBOM  2,440,379
TRANSPORT VEHICLE
Filed Jan. 12, 1945  2 Sheets-Sheet 2
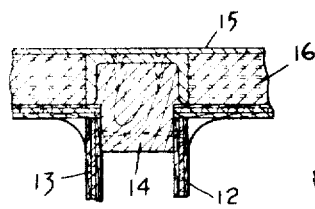
FIG. 7
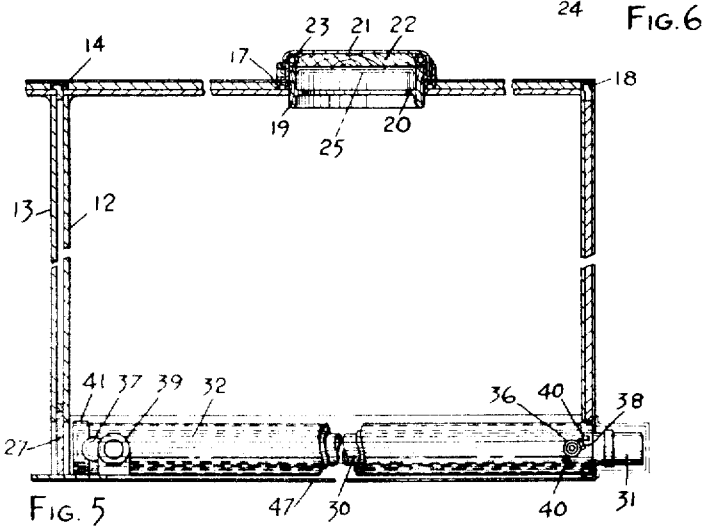
FIG. 6
FIG. 5
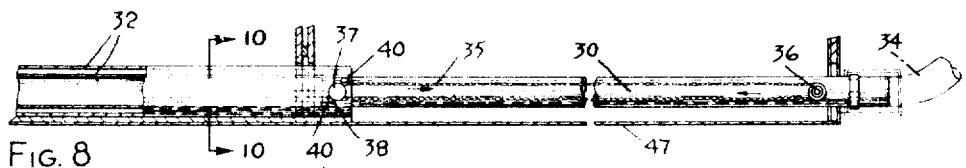
FIG. 8
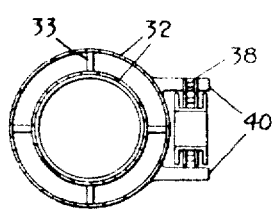
FIG. 10
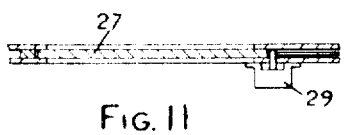
FIG. 11
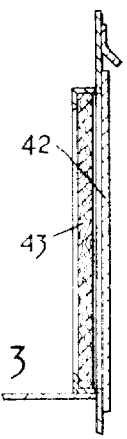
FIG. 13
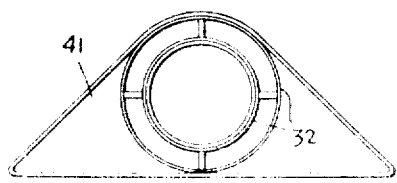
FIG. 12
RAGNAR A. NORBOM Patented Apr. 27, 1948

2,440,379

UNITED STATES PATENT OFFICE 2,440,379

TRANSPORT VEHICLE

Ragnar A. Norbom, New York, N. Y., assignor to National Fitch Corporation, a corporation of Delaware Application January 12, 1945, Serial No. 572,531

13 Claims. (Cl. 214—83.28)

This invention relates to certain improvements in cargo vehicles, for use on either highways or railways, for the transportation, in bulk, of flour, or other material of similar powdery or granular characteristics. As illustrated herein, the invention is particularly useful in connection with the bulk transportation, on railways, of flour, the handling of which has heretofore presented many problems and practical difficulties which the present invention seeks to eliminate.

Among the objects sought to be attained by the instant invention is a transport vehicle of substantial size (loads up to 75 tons) capable of rapid loading at a mill or other source of the manufactured or processed product, and which vehicle, when loaded, can be sealed practically air-tight for protection of the cargo against all of the known hazards, including weather and temperature changes, which have heretofore caused substantial losses to both manufacturers and shippers of processed products of this nature.

It is a further object of this invention to provide such a vehicle with means for its rapid unloading upon arrival at destination. Thus, the time for a complete and sanitary unloading of a 70 ton load of flour, at a terminal depot, can be effected in about 3 hours which represents a substantial saving in time and labor required over methods previously employed for the handling of car load lots of similar bulk material.

Another object of this invention is to provide a vehicle which is divided preferably into two compartments, the latter being specially shaped and constructed to facilitate both the loading and discharge of a bulk load of powdered or granular material, the shape of the compartments being such as to efficiently utilize the available lading space of the vehicle. Also, the compartments are relatively arranged, so that when filled, the load will be uniformly distributed over the vehicle supporting frame, from end to end, as well as laterally of the vehicle.

A further and important object of the present invention is to completely enclose and house the operating mechanism, used for discharging the cargo, so that at all times, including the time when the discharge mechanism is in operation, this enclosure (or enclosures) is protected against the entrance of dust or dirt that otherwise might contaminate the lading or render the discharge mechanism less cleanly and sanitary in the handling of a cargo so easily contaminated as flour.

An incidental objective of the instant invention is to equip the vehicle with a discharge mechanism, which functions in cooperation with existing terminal pneumatic facilities, so that the several compartments of a vehicle embodying this invention, may be unloaded simultaneously, thus materially reducing the time required to keep a vehicle "spotted" on a terminal siding. Also, each compartment is preferably provided with a plurality of top filling openings, so that the vehicle may be loaded at an equal or even greater rate than is required for its unloading.

The further objects and advantages of this invention will be understood from the following detailed description in which reference is made to the accompanying drawings, the latter forming a part of applicant's disclosure.

In these drawings, which illustrate one practical embodiment of the invention as applied to a railway vehicle:

Fig. 5 is a longitudinal section, in elevation, of a compartment, with its bottom wall removed, in order to illustrate the discharge mechanism for unloading the adjacent compartment through the centrally arranged, transverse bulkhead of the vehicle. The line of this section is indicated, approximately, by the line 5—5 on Fig. 3.

Fig. 6 is a sectional view of an inner closure or seal for the filling openings at top of the compartment, one of which is shown, in section, in Fig. 5;

Fig. 7 is an enlarged sectional view of the details of construction of the bulkhead and its joint with the roof of the vehicle;

Fig. 8 shows the discharge mechanism of Fig. 5 in its most extended position into the adjacent compartment from which the lading is to be removed;

Fig. 9 is a detail of the sprocket chain and added lug, by means of which the movable section of the discharge mechanism is moved from its position as shown in Fig. 5, to the position of Fig. 8;

Fig. 10 is a view, in section, of the discharge mechanism, taken on the line 10—10 of Fig. 8;

Fig. 11 is a view, partly in section, showing an electro-magnetic lock or detent for a sliding door which latter normally closes an opening in the inner end of a compartment, and through which door the discharge mechanism is projected in an unloading operation.

Fig. 12 is an end view of a triangular shaped frame member which is secured to the forward end of that part of the discharge mechanism which is projected into the compartment to be unloaded.

Fig. 13 is a sectional view through a part of an end panel of the vehicle, showing the location of a filter element for filtering the air that is required to be admitted for use with the discharge mechanism during the unloading operation.

Before entering into a detailed description of this invention and its method of operation, it is to be explained that its use presupposes available facility at the destination terminal of the vehicle for supplying a suitable electrical power supply, as well as a pneumatic suction conveyor system, for both of which the vehicle is equipped with outlet fittings providing readily detachable connections thereto. Such conveyor systems are known in the art, and hence form no part of the invention herein claimed. With an ample supply of air made available to the material to be handled (e. g., unloaded), such pneumatic systems are known to be able to lift comminuted, granular or powdery material to substantial heights. In the lifting of flour, e. g., by the pneumatic conveyor system, it has been found that approximately 3 cu. ft. of air must be supplied to the nozzle of the unloading mechanism for each pound of flour to be handled. Accordingly, one of the problems that is solved by the present invention is an ingenious arrangement of air supply that is made constantly available at the point of pick-up of the flour to be unloaded.

Figure 1:
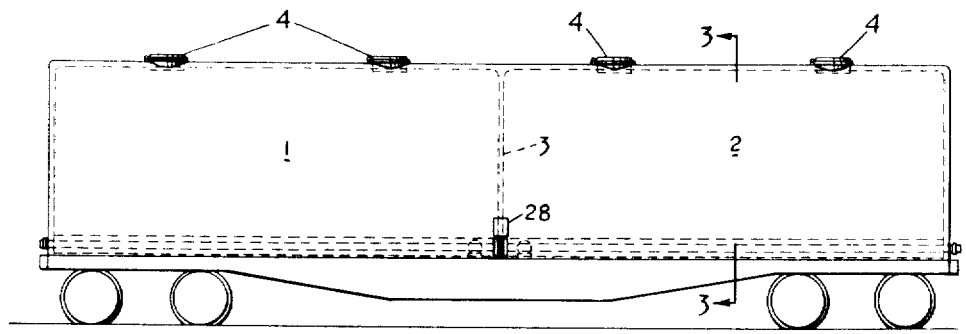
Figure 1 is a side elevation of a two-compartment railway vehicle, embodying the present invention.

In the drawings the general outlines of a railway vehicle which embodies the instant invention are shown in Fig. 1. In this embodiment the car is divided into two lengthwise compartments 1 and 2, the adjacent end walls of which are slightly spaced apart and form a transverse bulkhead, indicated at 3. Each compartment, at the top, is provided with two or more (two for each compartment shown) filling openings 4, which in over-all dimension are of man-hole size. The outer sheathing of the car, including top, sides, and endwalls is of sheet metal (preferably sheet steel), with a rounded top which merges into straight, vertical side walls, as clearly shown in Figs. 2 and 3. This sheathing, together with a floor plate, comprises a complete outer enclosure for the cargo compartments and also for the unloading or discharge mechanism.

Figure 2:
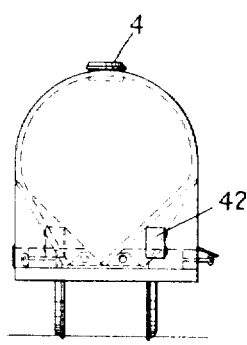
Fig. 2 is an end elevation of the vehicle of Fig. 1.
Figure 3:
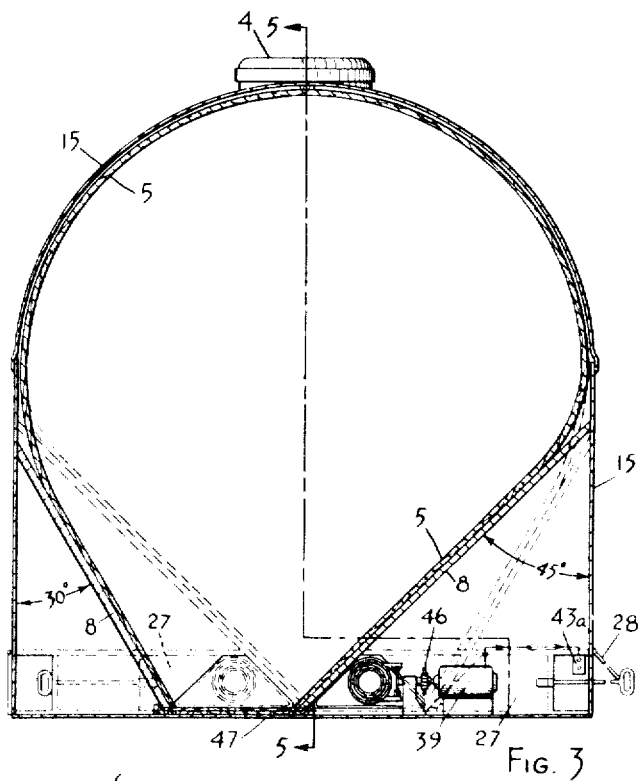
Fig. 3 is a transverse sectional view taken on the line III—III of Fig. 1.
Figure 4:
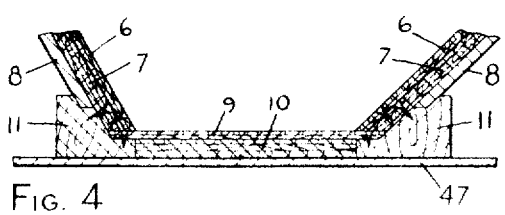
Fig. 4 is a section, somewhat enlarged, showing, in detail, the bottom and side-wall constructions of one of the compartments.

The compartments, in shape (cross-section) and relative arrangement, are illustrated in Figs. 2-4. Lengthwise, each compartment is approximately one-half of the car length, and each is designed to hold approximately one-half of the car load capacity. The shape of each compartment, in cross-section, is the same, i. e., each has a rounded top, conforming closely to the contour of the car outer sheathing, and downwardly and inwardly sloping side walls which converge toward a flat bottom wall section of relatively narrow extent. Referring to Fig. 3, which is a transverse section through compartment 2, the sloping side walls are disposed at different angles to the vertical, the one at the right being disposed at approximately 45° while the one at the left of this figure being at an angle of approximately 30°. The sloping side walls of the compartment 1 are shown in dotted lines in Fig. 3 and while its side walls have the same slopes as do those of compartment 2, it will be seen that the slopes are reversed, i. e., on the same side of the vehicle, the side wall of one compartment is arranged at a 45° slope, while the side wall of the other slopes at 30°. Thus, while the symmetrical center of each compartment is somewhat off, or to one side of the longitudinal center of the vehicle, the offset or out-of-line relation of the two compartments is such that an over-all balance of the load is maintained.

Since the details of construction of each compartment as well as its corresponding discharge mechanism are identical, it will only be necessary to describe one compartment and one of the discharge mechanisms.

For the handling of such commodities as flour, that are, or may be, affected adversely by temperature changes or moisture, the compartments are provided with a wooden lining. Preferably such lining, shown at 5 in Fig. 3, comprises a double layer of laminated wood. The inner layer 6 (Fig. 4) is of less thickness than the outer layer 7 and the two layers are supported and secured together to permit some slight relative movement. The use of this kind of material obviates numerous joints and presents a smooth and practically continuous (uninterrupted) surface. Along and beneath the inwardly sloping side walls, on both sides of the compartment, a metallic reinforcing plate 8 is provided which assists in supporting the load within the compartment, and also on one side, at the right in Fig. 3, this plate 8 provides a wall over a triangular space in which is housed the operating mechanism for unloading the other of the two compartments. These plates 8 each extend for the full length of the compartment, i. e., from the center bulkhead to the end of the vehicle, and they may be braced, if necessary, in accordance with known practice in car and vehicle body design.

The bottom or floor of the compartment is of relatively narrow width (approximately 2 ft. for the railway vehicle compartments) and, like the side walls, is preferably formed by a double layer of laminated wood or "plywood" of the same relative thickness as the walls of the compartment. The details of the floor construction are illustrated at Fig. 4, the upper and lower layers being marked 9 and 10, respectively. Longitudinally extending strips or stringers 11 serve to anchor and maintain the joints between the compartment walls and floor, as well as the bottom edges of the supporting plates 8. These stringers 11 are rigidly secured to the floor plate 47 of the vehicle or to the vehicle underframe.

At the center of the vehicle, the end walls of the two compartments, somewhat spaced apart, constitute a transverse bulkhead indicated by reference numeral 3 in Fig. 1. The details of the construction are shown in Figs. 5 and 7 from which it will be seen that the compartment end walls 12 and 13 are spaced apart (shown at the top) by a metal reinforced rib 14 which latter is welded or otherwise secured to the outer metallic sheathing 15 of the vehicle. The rib 14 extends completely around the top and outer side walls of the vehicle and, in addition to spacing apart the compartment end walls 12 and 13, it also constitutes a spacing element between the compartment walls and the outer metal sheathing of the vehicle. This latter spacing provides for an interposed insulating layer 16 of cork or other suitable insulating material, which is applied to provide thermal insulation for the top and side walls of the compartment and extending down to the point where the walls are met by the supporting plates 8. Beneath this point, the compartment side walls are thermally protected by the enclosed air space which is defined by the plates 8, the side vehicle sheathing 15 and the vehicle floor plate 47 (Fig. 3). Spacing ribs, [in addition to the one shown at 14] in the form of inverted channels, are employed to space the compartment walls from the vehicle outer sheathing. Two such ribs are shown at 17 and 18 in Fig. 5. The one shown at 18 additionally spaces the end wall of the compartment from the car end, and this space is also filled with thermal insulating material.

The details of construction of one of the several filling openings (two for each compartment illustrated in Fig. 1) and its cover are shown in Fig. 5. The opening is circular and is framed with a cylindrical sleeve 19 made of wood or other suitable non-metallic material. This sleeve is supported on the vehicle sheathing by an outer flange and has an internal annular shoulder or flange 20, the purpose of which flange will be explained in describing Fig. 6. The cover comprises an outer metallic cap 21 hinged at one side, and with the down-turned edge fitting into a surrounding sealing annulus, for dust and water tightness. The cap 21 is lined on the underside with a wooden disk, around the edge of which is placed a hollow gasket 23 of resilient material, e. g., of rubber. As an added protection for the lading, and especially against entry of dust and dirt, an inner manhole cap is provided as shown in Fig. 6. This cap is supported on the flange 20 of the frame 19 within the filling opening. The cap comprises two loops or flexible bands of slightly differing diameter and between which is clamped the edge of a cover 25 of canvas or similar strong fabric. A hinged flap 26 covers a hole or opening in the cover 25, the hole being of such circular size as to snugly fit around the nozzle of a discharge pipe through which the cargo is delivered into the compartment in the filling or loading operation. Thus, this inner cap acts to exclude all dust or rain which might otherwise enter the compartment during a filling operation, and also serves to trap dust or water that may leak into the filling opening with the outer cap in its closed position.

In the space between the compartment end walls 12 and 13, at the bottom thereof, there are provided sliding doors 27, one for each compartment. These doors control openings in the compartment end walls for the discharge of the cargo lading. These two doors are manually operable from opposite sides of the car and are best shown, in side elevation, in Fig. 3. In this view, the one door at the left is shown in closed position, and the one at the right (in dotted lines) is shown in the open position. These doors are operable by a handle. When the door is closed, the handle is inboard the vehicle and within a pocket, entrance to which latter is by lifting a hinged closure 28. The opening of either door 27, as a preliminary step to unloading a compartment is controlled by an electromagnetic detent or latch 29 (Fig. 11), the circuit for which is interlocked with the other electrical equipment used in an unloading operation in such manner that these doors can only be opened when the discharge mechanism is in operation or is in complete readiness for operation. This magnet 29 is normally de-energized, in which condition the locking detent is effective to prevent opening of the partition door with which it is associated.

The mechanism for effecting discharge of the contents of one compartment is positioned in the space that is provided beneath and to one side of the other compartment. Thus, the apparatus for discharging compartment 1 (Fig. 1) is beneath and to one side of compartment 2. In Fig. 3 the discharge operating mechanism is shown at the right of the figure. Referring now to Figs. 5 and 8, the discharging apparatus comprises a fixed suction pipe 30 that is positioned horizontally and extends from a hose connection fitting, outside of the end wall of the car, to a point closely adjacent the center transverse bulkhead 3. The length of this pipe is approximately that of a compartment, and it is rigidly supported in alinement with the opening in the end wall of the compartment to be emptied. The suction pipe 30 is surrounded by a sleeve-like member 32, of approximately the same length as the pipe 30. This sleeve, comprises an inner and outer tube spaced apart concentrically by spacers 33, as shown in Fig. 10. The inner tube is of a suitable internal diameter that will enable the sleeve, as a unit, to slide axially along the pipe 30 in the direction to enter the opposite compartment. Its completely extended position with reference to pipe 30 is illustrated in Fig. 8. As the sleeve 32 is advanced into the opposite compartment, the inner tube serves as an extension of the suction pipe 30 and the space between the inner and outer tubes of the sleeve 32 serves to conduct the required supply of air to the nozzle or pick-up end of the sleeve, whereby suction is made effective to draw the flour (or other similar powdered commodity) into the inner tube and thence into the suction pipe 30. In the unloading operation, it will be understood that the pipe 30 is detachably connected at its outer end to a suction line, e. g., a flexible hose 34, shown in dotted lines at Fig. 8, and that the hose 34 is part of a terminal facility that is equipped with a pneumatic conveyor system, as well as suitable storage bins or receptacles to receive the lading as it is discharged from the vehicle compartment.

In order to provide for moving the sleeve along the pipe 30 a sprocket chain drive is illustrated as one convenient way of accomplishing this result. Other drive means may be employed, such for example as a rack and pinion mechanism. However, the chain drive is preferred, since it possesses a certain amount of inherent flexibility and, in addition, it enables operation without the necessity of reversing the direction of operation of the driving motor. In the form shown, an endless sprocket chain 35 is supported on sprockets 36 and 37, which latter are supported adjacent and to one side of the pipe 30, one near each end thereof (Fig. 5). The chain 35 is provided with a driving lug 38, one being shown, on an enlarged scale at Fig. 9. The chain is driven by an electric motor 39 through a suitable reduction gear 46 (Fig. 3). The driving connection from the chain lug 38 to the sleeve 32 is by a pair of laterally extending arms 40 which are rigid with the sleeve 32, at the outer end thereof (Fig. 10). These arms 40 are displaced both vertically and axially, their axial displacement being shown in Figs. 5 and 8. The extent of their vertical displacement is best shown in Fig. 10 where it will be seen that one of the upper arms 40 lies closely adjacent the upper flight, and the lower arm similarly positioned with respect to the lower flight of the drive chain 35. The proximity of the arms to the flights of the drive chain is such that the lug 38 of the chain will contact one or the other of the arms 40 and thus establish a driving connection by means of which the sleeve 32 can be moved from the retracted position of Fig. 5 to the extended position of Fig. 8 and back again to the completely telescoped position on pipe 30 of Fig. 5. In the latter figure, and assuming that the travel of the chain 35 is in the direction of the arrows, the lug 38 is at the right hand end of its travel and, in moving around the sprocket wheel 36, it will engage the lower one of the arms 40 and move the sleeve 32 to the left until the lug disengages the arm 40 at the limit of the chain travel, as shown in Fig. 8. Thereafter, continued travel of the lug 38, around the sprocket 37 will reestablish a driving connection with the sleeve 32 through the upper one of the arms 40, and the resulting motion will return the sleeve 32 to the position which it occupies, relative to pipe 30, as shown in Fig. 5. Thus, so long as the sprocket chain continues to be driven, the tube 32 will be moved with a reciprocating motion, the length of the motion or the travel distance being substantially equal to the distance between the sprockets 36 and 37; and the rate of travel being determined by the gear ratio of the reduction gear 46. A rather slow reciprocating motion for the sleeve 32 makes for a uniform rate of discharge of the compartment lading. This gear ratio of drive can be varied, depending somewhat on the material to be unloaded and the suction pressure (vacuum) which is available at the unloading terminal.

At the end of the sleeve 32 which enters the compartment to be unloaded, this sleeve end is supported and guided by an open triangular frame member 41 which is rigidly secured to the outer end of tube 32 (Fig. 12). The lateral extent of this open frame member is such that its bottom band spans the bottom of the compartment (Fig. 4) along which it rides, and its somewhat rounded ends will contact with and be guided by the sloping side walls of the compartment. This frame member 41 also functions, in some degree, as a plow to loosen the powder material at the sides of the compartment bottom, to thereby avoid the formation of "tunnels" which might otherwise form and prevent the effective discharging of the cargo material.

As already described, the discharge mechanism is in a compartment which is completely enclosed on all sides. In order to provide for the admission of air that is required in the unloading operation, the end wall of the car, at each end, is provided with a vent opening having a hinged closure 42 the latter to be opened only during the unloading operation. This opening is also protected by an air filter 43 (Fig. 13) of known construction, which serves to prevent the entrance of dust and moisture that would otherwise be entrained with the air that is used in unloading, and prove harmful to a perishable cargo such as flour.

Electric power for operating the motor 39 is to be supplied by a suitable jumper connection to a power circuit, at a terminal. A plug receptacle (not shown) is provided for this connection on the car or vehicle. It is further intended that the circuit of the motor 39 will be interlocked with the facilities of the terminal in such manner that the motor cannot be energized until the vehicle to be unloaded has been properly connected with the pneumatic conveyor system of the terminal, and suction pressure is established in the discharge pipe 30. When these conditions have been established, the magnetic latch 29 on the sliding compartment doors 27 will be withdrawn, so that by opening the door 28 to the small compartment at the center of the vehicle, an operator can pull the door 27 to the open position, and by operation of a switch 43—a located within the small compartment (Fig. 3), can start the operation of the motor 39. With the motor in operation and suction pressure being maintained within the pipe 30, the unloading operation begins. The sleeve 32 is protruded into the compartment, and travels therethrough, along its flat bottom. The sleeve 32 continues to reciprocate, back and forth, at a rather slow rate, until the entire load within the compartment has been withdrawn and discharged through pipe 30. In practice, it has been found to require about six complete passes of the sleeve 32, into and out of the compartment, in order to complete an unloading operation. The difference in slope of the compartment side walls is found to facilitate complete discharge of fine powder or granular material from the compartment. Thus the downward sliding movement on the side of the compartment having the steeper slope (30°) tends to move at a faster rate than on the opposite side, with the result that the faster moving material agitates the slower moving material, to the end that there is little tendency of any of the lading to remain in the compartment. If required, in the handling of some material, in order to prevent sticking along the side walls, electric vibrators of known design can be attached with strikers working against the under sides of the steel plates 8 to assist in completion of the unloading operation by jarring the material with sufficient force to loosen its hold on the side walls.

Having now described one practical embodiment of my invention, which I believe to be novel, and for which patent protection is sought, what I claim as my invention is defined in the following claims:

1. In a vehicle for transporting flour or similar finely-crushed or granular material in bulk, the combination comprising: two enclosed lading compartments in end-to-end relation, each extending approximately one-half of the length of the vehicle with their adjacent transverse end walls at approximately the longitudinal center of the vehicle, the compartment at one end having its bottom wall out-of-line, longitudinally of the vehicle, with the bottom wall of the other compartment; two suction conducting means mounted within the vehicle and exteriorly of the compartments for discharging the lading of the said compartments, one said means being positioned to operate along the bottom wall of each of the compartments and each comprising an extensible suction nozzle with operating mechanism therefor, mounted on the vehicle, for moving the said nozzles into and along the bottom walls of the respective compartments lengthwise thereof; and connection fittings on the vehicle for connecting each of the nozzles with a terminal source of suction.

2. The combination of claim 1 in which each suction nozzle is provided with means for conducting air from outside the compartment for discharge at the end of the nozzle where the suction is effective in an unloading operation.

3. The combination of claim 1 in which the suction conducting means comprises a fixed pipe section and a concentrically arranged pipe section mounted for sliding on the fixed section, the lengths of the two sections being substantially the same and approximately equal to the length of the compartment to be unloaded.

4. The combination of claim 1 with suction conducting means comprising a fixed pipe section and a double wall concentrically arranged pipe section mounted for sliding on the fixed section, the inner wall of the double wall section being of only slightly larger diameter than the outer diameter of the fixed pipe section, and the space between the inner and outer walls of the double wall section providing a conduit for conducting a supply of air from end to end of the double wall section.

5. The combination of claim 1 in which the operative end of the nozzle is provided with a laterally extending hollow frame member rigidly secured thereto, which member serves to guide the nozzle end along the bottom of the compartment and to resist rotation of the nozzle.

6. The combination of claim 1 in which the operating mechanism for extending the nozzle comprises a motor-driven endless sprocket chain supported for operation in horizontal position with the chain flights closely adjacent to and parallel with the nozzle, a driving lug on the chain and a pair of lugs on the nozzle positioned and displaced to be successively engaged by the lug on the chain, the driving connection between the chain lug and one of the nozzle lugs being operative to move the nozzle to the limit of its movement in one direction and in the opposite direction to the same extent when the chain lug engages the other nozzle lug.

7. In a vehicle for transporting flour or similar finely-crushed or granular material in bulk, the combination comprising; two enclosed lading compartments in end-to-end relation, each extending approximately one-half of the length of the vehicle with their adjacent transverse end walls at approximately the longitudinal center of the vehicle, the compartment at one end having its bottom wall out-of-line, longitudinally of the vehicle, with the bottom wall of the other compartment; sliding closures for discharge openings in adjacent end walls at the longitudinal center of the vehicle, said openings being in line with the bottom wall of the respective compartments, a suction conducting means alined with each said opening, the two said conducting means extending oppositely from the center of the vehicle to opposite ends thereof, each said conducting means extending along and to one side of a vehicle compartment for the full length thereof, the said conducting means comprising extensible suction nozzles and operating mechanism therefor to move the nozzles into and lengthwise along the bottom walls of the respective compartments; and detachable connection fittings on the vehicle at opposite ends thereof for connecting each of said nozzles with a terminal source of suction for simultaneous discharge of the lading from both compartments.

8. In a railway car for transporting flour or similar finely-crushed or granular material in bulk, the combination comprising: a car body with continuous outer sheathing on all sides and joined at the bottom with a floor plate which latter is coextensive with the supporting car underframe; two enclosed lading compartments within the outer car sheathing, in end-to-end relation, each extending approximately one-half of the length of the car and having their adjacent transverse end walls at approximately the longitudinal center of the car, each compartment having sloping side walls which converge and at the floor level are joined by a relatively narrow horizontal bottom wall, the bottom walls of the two compartments being on opposite sides and extending along the center line of the car; suction operated conveying means for discharging the lading of the compartments at opposite ends of the car, the said means being housed in space beneath the sloping side walls of the compartments and enclosed by the outer sheathing and floor of the car, and an air filter positioned to admit filtered air to the said space during a load discharging operation.

9. The combination of claim 8 in which the compartment walls are spaced from the car outer sheathing with interposed thermal insulation.

10. In a container for transporting flour or similar finely-crushed or granular material in bulk, the combination comprising; an enclosed lading compartment having sloping side walls converging toward a relatively narrow bottom wall, the top wall of the compartment having one or more filling openings and closures therefor to seal the same against the entry of dust and moisture, suction conducting means for withdrawing the compartment lading, the said means comprising an extensible nozzle supported exteriorly of the compartment for operating within and along the bottom wall thereof, the extensibility of the nozzle being such that it can be extended to reach from end to end of the compartment, mechanically operated means for extending the nozzle into the compartment and for back and forth rectilinear movement along the bottom thereof, means for conducting a supply of air from outside the container for discharge at the end of the nozzle where the suction is effective during an unloading operation, and a fitting accessible from outside the container for connecting the nozzle with a terminal source of suction.

11. The combination of claim 17 in which one of the sloping side walls of the compartment is of steeper slope than the other to provide a differential of rate of downward sliding movement of the lading along the compartment side walls in an unloading operation.

12. In a facility for the handling of flour or other finely-crushed or granular material in bulk, the combination comprising: a bin or container having sloping side walls which converge toward a relatively narrow and substantially horizontally disposed bottom wall; suction conducted means for withdrawing the contents of said container, the said means comprising an extensible nozzle horizontally supported exteriorly of the container for movement within and along the bottom wall thereof, the extensibility of the nozzle being such that it can be extended to reach from end to end of the container; means for moving the said nozzle into and along the bottom wall of the container from end to end thereof; means for conducting filtered air from outside the container for discharge at the pick up end of the nozzle; and means at the discharge end of said conducting means adapted to connect the nozzle with a suction source.

13. In a facility for the handling of flour or other milled or granular material in bulk, the combination comprising: a closed container having sloping side walls which converge toward the bottom of the container to form a relatively narrow trough, extending horizontally along the bottom of the container; suction conducting means for withdrawing the contents from said container, the said means comprising an extensible nozzle that is horizontally supported exteriorly of the container for operation within the container and along the bottom of the said trough, the extensibility of the nozzle being such that it can be extended to reach from end to end of the container; means surrounding and co-extensive with the extensible nozzle for conducting air therealong for discharge at the end of the nozzle where the suction is effective in an unloading operation.

RAGNAR A. NORBOM.

REFERENCES CITED

The following references are of record in the file of this patent:

UNITED STATES PATENTS

| Number | Name | Date |
|---|---|---|
| 955,952 | East | Apr. 26, 1910 |
| 1,630,972 | Schmid | May 31, 1927 |
| 1,653,631 | Kirkland | Dec. 27, 1927 |
| 1,665,625 | Davidson | Apr. 10, 1928 |
| 1,778,100 | Webb | Oct. 14, 1930 |
| 1,922,330 | Robinson | Aug. 15, 1933 |
| 2,175,541 | Probert | Oct. 10, 1939 |
| 2,190,727 | McKenna | Feb. 20, 1940 |

FOREIGN PATENTS

| Number | Country | Date |
|---|---|---|
| 270,958 | Great Britain | May 19, 1927 |
| 463,953 | Germany | Aug. 6, 1928 |

---

Certificate of Correction

Patent No. 2,440,379.     April 27, 1948.

RAGNAR A. NORBOM

It is hereby certified that errors appear in the printed specification of the above numbered patent requiring correction as follows: Column 4, line 38, for "operatng" read *operating*; column 10, line 45, claim 11, for the claim reference number "17" read *10*; and that the said Letters Patent should be read with these corrections therein that the same may conform to the record of the case in the Patent Office.

Signed and sealed this 27th day of July, A. D. 1948.

[SEAL]

THOMAS F. MURPHY,
*Assistant Commissioner of Patents.* row trough, extending horizontally along the bottom of the container; suction conducting means for withdrawing the contents from said container, the said means comprising an extensible nozzle that is horizontally supported exteriorly of the container for operation within the container and along the bottom of the said trough, the extensibility of the nozzle being such that it can be extended to reach from end to end of the container; means surrounding and co-extensive with the extensible nozzle for conducting air therealong for discharge at the end of the nozzle where the suction is effective in an unloading operation.

RAGNAR A. NORBOM.

REFERENCES CITED

The following references are of record in the file of this patent:

UNITED STATES PATENTS

| Number | Name | Date |
|---|---|---|
| 955,952 | East | Apr. 26, 1910 |
| 1,630,972 | Schmid | May 31, 1927 |
| 1,653,631 | Kirkland | Dec. 27, 1927 |
| 1,665,625 | Davidson | Apr. 10, 1928 |
| 1,778,100 | Webb | Oct. 14, 1930 |
| 1,922,330 | Robinson | Aug. 15, 1933 |
| 2,175,541 | Probert | Oct. 10, 1939 |
| 2,190,727 | McKenna | Feb. 20, 1940 |

FOREIGN PATENTS

| Number | Country | Date |
|---|---|---|
| 270,958 | Great Britain | May 19, 1927 |
| 463,953 | Germany | Aug. 6, 1928 |

---

Certificate of Correction

Patent No. 2,440,379.   April 27, 1948.

RAGNAR A. NORBOM

It is hereby certified that errors appear in the printed specification of the above numbered patent requiring correction as follows: Column 4, line 38, for "operatng" read *operating*; column 10, line 45, claim 11, for the claim reference number "17" read *10*; and that the said Letters Patent should be read with these corrections therein that the same may conform to the record of the case in the Patent Office.

Signed and sealed this 27th day of July, A. D. 1948.

[SEAL]

THOMAS F. MURPHY,
*Assistant Commissioner of Patents.*